United States Patent Office 3,326,778
Patented June 20, 1967

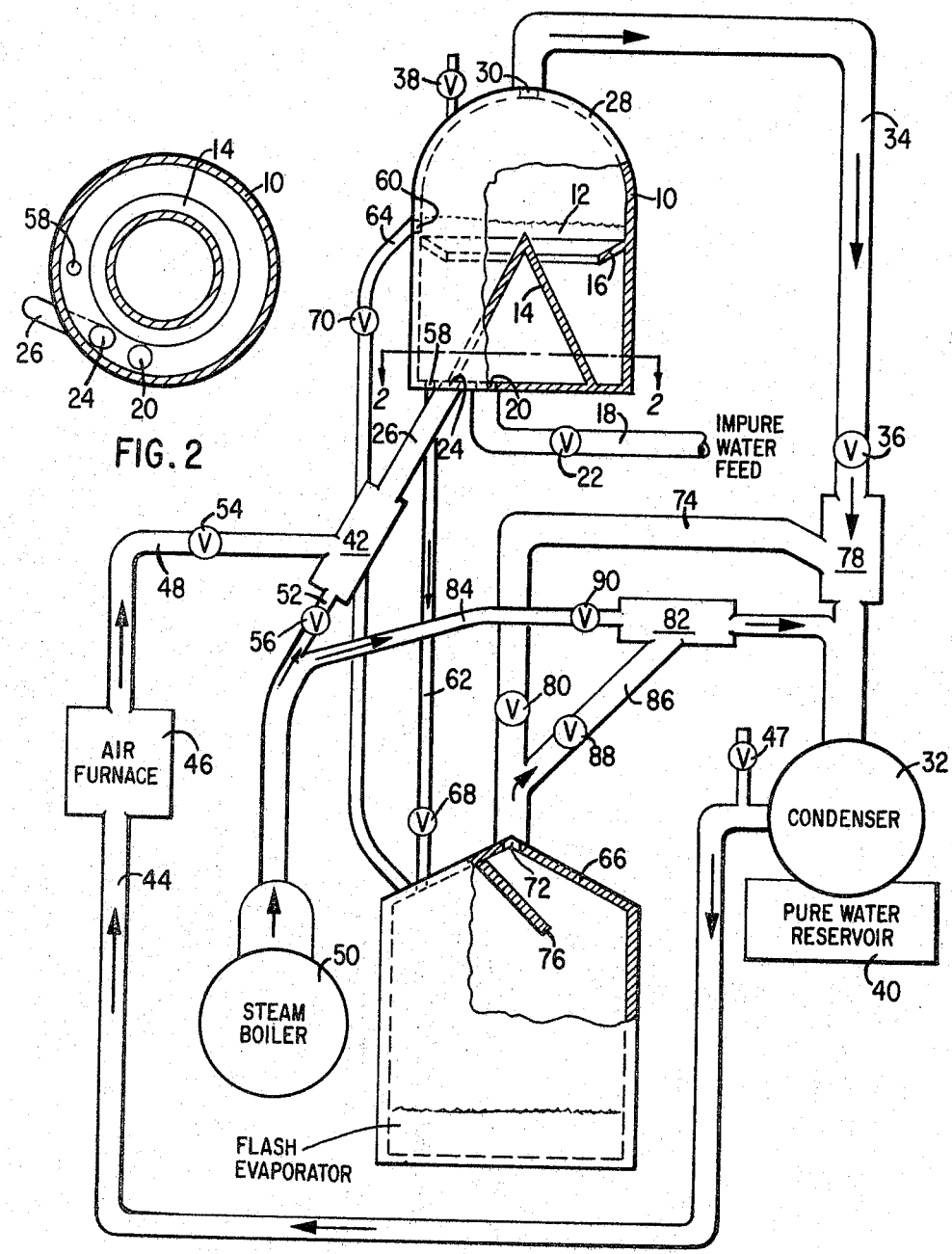

3,326,778
DIRECT CONTACT FLASH DISTILLATION WITH
AIR AND STEAM
Arthur E. Mock, Slidell, La. 70458
Filed Dec. 27, 1962, Ser. No. 247,573
6 Claims. (Cl. 202—234)

This invention relates in general to a novel process, and apparatus to practice same, for extracting pure water from impure water which finds particular use in desalinating sea water.

The novel process of the invention basically involves the rapid passage of dry gas, preferably air, at extremely high temperature through an enclosure body of impure water whose surface is exposed to a gas environment of relatively high pressure, with the temperature of said impure body being maintained just below its boiling point for said environmental pressure even though the temperature of the air rapidly passing therethrough is substantially higher than said boiling point. The air is saturated with water vapor which in turn can be extracted by condensation. The temperature of the impure body is maintained below its boiling point by adding impure water to the body as well as withdrawing concentrated impure water therefrom. This procedure is further refined by sending the withdrawn concentrated impure water to a flash evaporator unit so that its heat is not wasted. The concentrated impure water flashes into vapor and is then condensed.

Novel apparatus for practicing the process is also disclosed whereby the highest efficiency may be obtained. In particular, a steam ejector is employed to compress hot dry air prior to its injection into the impure water body. The result is an air-steam mixture which is introduced into the impure water. This technique, besides increasing even more the temperature of the air and compressing same so that it erupts through the impure water, further adds the heat of the steam directly to the impure water and so eliminates the need for heating means external to tank 10 which thereby prevents formation of scale since there is no contact by the impure water with any heated tank wall. Furthermore, by virtue of the heat supplied by the steam to the water, less heat is taken from the air so that its temperature remains high in order to maintain a relatively high water vapor absorption capacity. Another novel mechanical feature of the apparatus resides in the construction of the tank wherein the air-steam mixture is exposed to the impure water. By introducing the mixture tangentially to the body and providing guide means for the swirling water, maximum contact is made by the air with said water.

Therefore, one object of the present invention is to provide a process for extracting pure water from impure water whereby a jet of extremely hot, dry saturable gas is rapidly passed through said impure water, while at the same time maintaining a high pressure gas environment over the surface of the water and further maintaining the temperature of the impure water at a temperature just below its boiling point for said environmental pressure.

One more object of the present invention is to prevent the accumulation of impurities during the gas absorption step by expelling the concentrated impure water to a separate drop-out location.

Another object of the invention is to provide a process whereby both gas saturation and flash evaporation techniques are employed in successive steps which cooperate together to increase efficiency by preventing heat waste.

A further object of the present invention is to provide apparatus for heating and compressing the saturable gas with great efficiency, as well as providing additional direct heating for the impure water through which the gas passes.

A further object of the present invention is to provide a novel mixing tank whose bottom has a configuration to promote contact of the saturable gas with the impure water.

These and other objects of the present invention will become apparent during the course of the following description, which is to be read in conjunction with the drawings, in which:

FIGURE 1 is a system layout of the apparatus used in practicing the novel process; and FIGURE 2 is a sectional plan view of the mixing tank which emphasizes its novel features.

Referring now to the drawing, reference numeral 10 in FIGURE 1 generally indicates a mixing tank wherein a quantity or body 12 of impure water, for example sea water, is processed by the swift passage of air or some other water saturable gas therethrough. Mixing tank 10 is a closed, pressurized vessel preferably having a circular cross-section best shown in FIGURE 2. The central part of its bottom surface is formed in an inverted cone 14 which has the novel function of preventing the creation of a void in the center of water 12 as it is swirled about in the mixing tank. This enhances the air-water contact as will subsequently be described. A circular, downwardly extending baffle 16 is attached to the side wall of tank 10 in order to prevent the swirling water therein from creeping up the tank sides. Impure water is continually fed into the bottom of tank 10 via conduit 18 and inlet 20. This flow may be regulated by a valve 22 according to the criteria described hereinafter. FIGURE 2 shows that inlet 20 is located in the space between the side wall and the inner cone member 14 of tank 10. A mixture of hot, dry air and steam is injected into the impure water via an inlet 24 and conduit 26. It will be noted that the flow axis of conduit 26 is such as to introduce the mixture in a direction substantially tangential to the periphery of the impure water body 12, and that inlet 24 further is situated so that said mixture is immediately placed in contact with the impure water entering at inlet 20. Since the air-steam mixture in conduit 26 enters at high pressure, it causes a swirling of the impure water 12 which thereupon rotates in FIGURE 2 about cone member 14. The greatest velocity of the water particles in tank 10 occurs near its bottom since this is where the air enters at high speed from inlet 24. Therefore, due to the larger centrifugal force at this location there is a wider separation of water in tank 10 near its bottom, with respect to its center, than is present near its top. This would normally lead to a collapsing of water from the surface to the bottom of tank 10 except for the presence of cone 14. Cone member 14 prevents such turbulence, which would tend to create momentary voids, by acting as a guide for the impure water as it rotates. This insures that more water particles are exposed to the saturable air being erupted therethrough, since the air rises through successive layers of water which are not constantly changing elevation.

The air environment within tank 10 over the surface of water 12 is maintained at pressure substantially higher than atmospheric pressure by virtue of dome 28. An outlet 30 is provided near the top of the dome through which this pressurized environment is bled to a condenser 32 via a conduit 34. Valve 36 is situated in conduit 34 in order to control the flow of vapor therein according to requirements of the process. An auxiliary release valve 38 may be provided at the top of tank 10 in order to further adjust the environmental pressure therein. Condenser 32 has the function of extracting the pure water vapor contained by the saturated environment bled from tank 10. This condensate is deposited in a pure water reservoir 40 which is connected to condenser 32.

The hot, dry air forced through tank 10 is provided thereto from conduit 26 which feeds into tank 10 via inlet 24. This air stream is generated in novel fashion through the use of a steam ejector 42 which compresses the air stream to such an extent that it actually erupts through impure water 12. Cool, dry air, which for the sake of greater efficiency is preferably obtained from condenser 32 via conduit 44, is initially passed through an air furnace 46 which heats said air to a high temperature, thus increasing its saturability. Additional air may be obtained via inlet valve 47. This hot, dry air is then pulled from furnace 46 via a conduit 48 through the suction inlet of ejector 42. A source of superheated steam 50 has its outlet connected to the steam inlet of ejector 42 via a conduit 52. The steam from boiler 50 has the primary function of drawing the air from furnace 46 by creating a vacuum in ejector 42, and at the same time, compressing the hot, dry air to high pressure for injection into tank 10. This compression in turn increases the air temperature to an even greater degree. In addition, the heat contributed by the steam in the air-steam mixture entering tank 10 aids in heating the impure water 12 to the desired temperature, which is that temperature just below its boiling point for the environmental pressure in the tank. This feature of steam injection along with the hot, saturable air is beneficial in at least two ways. First, less heat is taken from the air for heating the impure water, which thereby maintains the air temperature at a value conducive to high absorption of water vapor thereby. Second, it eliminates the need for heating the walls of tank 10 by external means, and thereby prevents the formation of scale thereon which would otherwise occur if the impure water came into contact with a heated surface. Valves 54 and 56 are provided in conduits 48 and 52, respectively, in order to provide control over the hot, pressurized air-steam mixture.

The temperature of the impure water in tank 10 should be high in order for a large amount of water vapor to be absorbed by the air stream and the air environment. This heat is primarily provided by the steam in the injected mixture. On the other hand, boiling of the water is not necessary or even desirable, since the larger latent heat required to convert saturated water to steam would make the system less efficient. Furthermore, if sea water is being purified, then any boiling of same under pressure causes foaming of the salt. However, since the novel process of the present invention requires that the dry air injected into tank 10 also be of extremely high temperature in order to increase its ability to absorb water vapor from body 12, the temperature of body 12, even under a fairly high pressurized environment, might well reach its boiling point after a period of time. Therefore, outlet means are provided from tank 10 to withdraw the concentrated impure water, said outlet acting in conjunction with the impure water feed valve 22 in order to maintain the water temperature just below its boiling point. In the preferred embodiment of the apparatus, an outlet 58 is provided in the bottom of tank 10, and an outlet 60 is provided in the side wall of tank 10 at the surface of the impure body. It will be noted that outlet 58 is positioned with respect to the air-stream inlet 24 so that the air has a chance to perform its absorbing function before the concentrated water is withdrawn from tank 10. The same is true for outlet 60 which is provided to withdraw concentrated impure water at the surface of the body. Outlets 58 and 60 are connected with conduits 62 and 64 respectively, which in turn feed to a flash evaporator tank 66. Valves 68 and 70 are respectively included in these conduits to control the withdrawal of concentrated impure water according to the rate of absorption and to the temperature at which body 12 must be maintained.

Flash evaporator tank 66 has an environment of much lower pressure, preferably near vacuum, as compared to the pressure in tank 10, so that the entering concentrated impure fluid from tank 10 flashes into steam due to its relatively high temperature. The impurities, such as salt, fall to the bottom of tank 66 and may be removed therefrom by means not disclosed. The flashed vapor in turn is extracted through an outlet 72 and into conduit 74 to condenser 32 whereupon it may be condensed as an additional source of pure water. A baffle 76 is provided in tank 66 in order to create a tortuous path for the flashed vapor before it exits therefrom, so that there is maximum drop-out of salt or other impurities. The extremely low pressure in tank 66 is created primarily by the use of an ejector 78 in conduit 34 whose suction inlet is connected to conduit 74. Valve 80 governs the flow in conduit 74. By this arrangement, the air passing through conduit 34 pulls the vacuum on tank 66. If additional vacuum is desired, then an auxiliary steam ejector 82 can be provided which is supplied from boiler 50 via conduit 84. A conduit 86 from tank 66 is connected to its suction inlet. Valves 88 and 90 are provided to adjust for the most efficient operation.

Certain pressure and temperature relationships of the novel process will now be described in detail. In general, the object of the process is to pass extremely hot, dry saturable gas through heated impure water while at the same time creating a pressurized gas environment over the surface of the water. These conditions cause the absorption of huge quantities of pure water but without the formation of steam, since at the same time the temperature of body 12 is maintained below its boiling point for the environmental pressure. The higher the temperature of the gas, preferably air injected into tank 10, the more water it absorbs fom body 12. Furnace 46 should therefore be capable of heating the cool, dry air from condenser 32 (or from any other source) to a high temperature, preferably 1000° F. or above. This hot, dry air in conduit 48 acquires additional heat upon being compressed in ejector 42, so that it is extremely hot upon entering tank 10. In fact, special heat resistant material should be used in the fabrication of conduit 24 so that it will not melt. Instead of providing a separate furnace 46 for initially heating the air, an alternative arrangement might be to pass the air through coils surrounding boiler 50. Boiler 50 preferably should also generate super heated steam having temperature preferably ranging between 750°–900° F. The reason for this high temperature is that the steam otherwise would have too great a cooling effect upon the hot air in conduit 48 when the two gases mix together in ejector 42. The pressure of the air jet entering tank 10 should be preferably upwards of 400 p.s.i. This results in an actual erupting of the air through body 12 at high speed so that there is a far greater amount of air contacting the water in a given space of time than if the air entered under a low pressure. By the use of the steam ejector, this air pressure can be easily obtained.

The pressure of the air environment above the surface of body 12 in tank 10 should also be relatively high, preferably above 200 p.s.i., as compared with atmospheric pressure of 14.7 p.s.i. This environment is bled off by outlet 30, but is constantly replenished by the air stream passing through body 12. The high pressure in tank 10 permits the impure water 12 to be heated to a high temperature so as to increase the amount of water vapor available for absorption by the hot jet of air being passed therethrough. Furthermore, the air environment, by virtue of its high temperature and pressure, also continues to absorb pure water from the surface of body 12 until it becomes fully saturated.

Although the air-steam mixture passing through body 12 is much hotter than the boiling point of said body, the temperature of the water is kept below its boiling point by regulation of the impure water feed through valve 22 and the withdrawal of the concentrated impure water through valves 68 and 70. The flash evaporator drop-out tank 66 is therefore essentially a temperature and water level regulator for the liquid in tank 10. It also serves as a salt and other impurity depository in order to eliminate clogging of tank 10. Furthermore, in removing the concentrated impure water from tank 10 and evaporating that water into steam by the release of pressure thereon, its heat is not wasted since said steam is recovered and condensed to provide an auxiliary source of pure water. The pressure in tank 66 should be quite low relative to the tank 10 pressure, preferably at near vacuum, in order that the greatest possible amount of concentrated impure water will be evaporated. Although not shown, pressure and temperature gauges are employed in the system to indicate the operating conditions.

While a preferred embodiment of the present invention has been shown and described, it is understood that various modifications may be made thereto by persons skilled in the art without departure from the novel principles enumerated in the appended claims.

I claim:
1. Apparatus for purifying a body of impure water comprising:
   a closed pressure vessel for holding a body of impure water, said vessel having a first inlet adapted for connection to a source of impure water, a second inlet for injecting a stream of water vapor absorbing gas into said body, and an outlet for bleeding off the pressurized environment above the surface of said body;
   a condenser having a vapor inlet connected to said vessel outlet and a condensate outlet for withdrawing purified water;
   a source of superheated steam;
   a source of dry air at a temperature of at least 1000° F.;
   an ejector having its first inlet connected to said steam source, its second inlet connected to said dry air source, and its pressure outlet connected to said second inlet of said vessel for compressing the dry air to a high pressure prior to injection into said vessel; and
   means comprising a concentric bottom portion integral with said vessel and extending upwardly from the bottom thereof for preventing the creation of a void in the center of the body when said water vapor absorbing gas is injected into said body, said second inlet of the vessel located at the bottom thereof between an outer wall of the vessel and said upwardly extending bottom portion.

2. Apparatus according to claim 1 including a flash evaporator tank held at low pressure and having an inlet connected to a second outlet of said closed pressure vessel and an outlet for withdrawing flashed vapor from said flash evaporator tank.

3. Apparatus according to claim 2 wherein said second inlet enters near the bottom of said vessel with its flow axis oriented so as to inject said water vapor absorbing gas tangential to the periphery of the upwardly extending concentric bottom portion of said vessel in order to promote swirling about said concentric bottom portion.

4. Apparatus according to claim 3 wherein said concentric bottom portion is in the shape of a cone.

5. Apparatus according to claim 1 wherein said second inlet enters near the bottom of said vessel with its flow axis oriented so as to inject said water vapor absorbing gas tangential to the periphery of the upwardly extending concentric bottom portion of said vessel in order to promote swirling about said central portion.

6. Apparatus according to claim 5 wherein said concentric bottom portion is in the shape of a cone.

References Cited

UNITED STATES PATENTS

| | | | |
|---|---|---|---|
| 1,225,226 | 5/1917 | Doherty | 203—100 X |
| 2,042,713 | 6/1936 | Gray | 203—100 X |
| 2,756,029 | 7/1956 | Brogdon | 203—10 |
| 2,756,208 | 7/1956 | Axelrad et al. | |
| 2,856,074 | 10/1958 | Dubitzky. | |
| 2,902,414 | 9/1959 | Schmerzler | 203—49 X |
| 2,921,004 | 1/1960 | Wood | 203—10 |
| 2,976,224 | 3/1961 | Gilliland | 203—10 |
| 3,026,261 | 3/1962 | Mayfield et al. | 203—10 |
| 3,080,302 | 3/1963 | Rogers et al. | 203—10 |

NORMAN YUDKOFF, *Primary Examiner.*

F. E. DRUMMOND, *Assistant Examiner.*